United States Patent [19]

Scanlon et al.

[11] Patent Number: 4,460,994

[45] Date of Patent: Jul. 17, 1984

[54] LOOP COMMUNICATION SYSTEM

[75] Inventors: John M. Scanlon, Wheaton; Matthew F. Slana, Naperville, both of Ill.

[73] Assignee: AT&T Bell Laboratories, Murray Hill, N.J.

[21] Appl. No.: 308,443

[22] Filed: Oct. 5, 1981

[51] Int. Cl.³ .............................................. H04J 3/02
[52] U.S. Cl. ....................................... 370/88; 370/89
[58] Field of Search ............................ 370/88, 89, 86; 340/825.05

[56] References Cited

U.S. PATENT DOCUMENTS

| | | | |
|---|---|---|---|
| 3,586,782 | 6/1971 | Thomas | 179/15 |
| 3,652,798 | 3/1972 | McNeilly et al. | 179/15 AL |
| 3,859,468 | 1/1975 | Smith et al. | 179/15 AL |
| 4,205,326 | 5/1980 | Porter et al. | 340/147 |
| 4,347,605 | 8/1982 | Hashizume et al. | 370/88 |

FOREIGN PATENT DOCUMENTS

| | | | |
|---|---|---|---|
| 2,917,675 | 11/1980 | Fed. Rep. of Germany | 370/88 |
| 2049357 | 12/1980 | United Kingdom | 370/88 |
| 2054324 | 2/1981 | United Kingdom | 370/88 |

Primary Examiner—Douglas W. Olms
Attorney, Agent, or Firm—K. H. Samples

[57] ABSTRACT

A loop communication system, interconnecting a number of nodes around the loop, in which two oppositely directed unidirectional loops service the two directions of transmission. Each of the loops comprises a time division multiplexed transmission facility. Each of the nodes has facilities for connecting the communications on each incoming channel to a utilization device connected to that node, for connecting the communication from a utilization device connected to that node to each outgoing channel, or for repeating the communication from any incoming channel to a corresponding outgoing channel. Assignment of a communication to a given channel is accomplished using a centralized control means which causes the communicating devices to be connected using corresponding channels in the two loops, and using that portion of the loop which has the smaller number of intermediate nodes.

14 Claims, 5 Drawing Figures

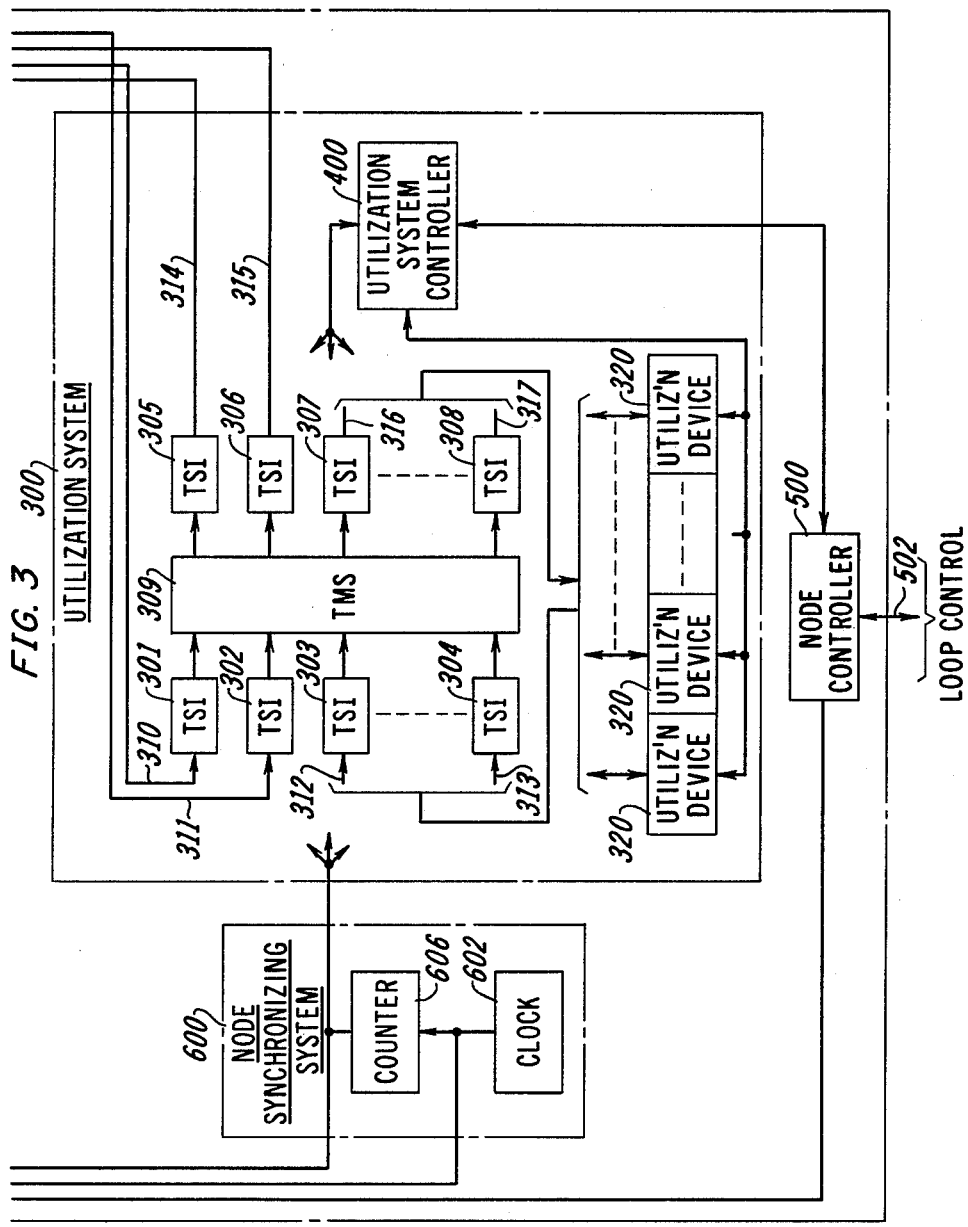

FIG. 5
AVAILABILITY MAP
OF
COMMUNICATION LINES & CHANNELS

COMMUNICATION LINE 801, 802, 803, 804, 805, 806,
808, 809, 810, 811, 812, 807

| | 801,808 | 802,809 | 803,810 | 804,811 | 805,812 | 806,807 |
|---|---|---|---|---|---|---|
| 1 | 1 | 1 | 1 | 1 | 1 | 1 |
| 2 | 1 | 1 | 0 | 1 | 0 | 1 |
| 3 | 1 | ▨ | 1 | 0 | 1 | 0 |
| 4 | 1 | 0 | 0 | 1 | 1 | 0 |
| --- | --- | --- | --- | --- | --- | --- |
| 256 | 1 | 1 | 0 | 1 | 1 | 1 |

850

CHANNEL

FIG. 4
NODE 100

| FIG. 2 | FIG. 3 |
|---|---|

LOOP COMMUNICATION SYSTEM

TECHNICAL FIELD

The present invention relates o time multiplexed loop transmission systems, and more particularly, to arrangements for efficiently utilizing time multiplexed channels in bidirectional loop transmission systems.

BACKGROUND OF THE INVENTION

Loop transmission systems generally comprise a unidirectional communication path and a plurality of nodes which are connected to the communication path to provide a means for their intercommunication. As large capacity time division multiplexed transmission facilities, e.g., fiber optic systems, become available, the use of loop transmission systems for the connection of a large number of high traffic nodes becomes more attractive. One type of loop transmission system, called a time-multiplexed communication system, utilizes cyclically occurring time-separated channels for the communication of information between various nodes. With prior time-multiplexed loop transmission systems, a given time-separated channel on the communication path is utilized to transmit information from a first node to a second node for a given communication, and the same channel is used over the remainder of the loop for information transmission from the second node to the first node. Thus, once a time-separated channel is assigned to a communicating pair of nodes, that channel is used around the entire loop and cannot be used in other communication until the prior assignment is canceled. The assignment of a given channel to a communicating pair of nodes, however, does not stop other pairs of nodes from communicating as long as other time-separated channels are available. During the information exchange between the exemplary first and second nodes, the other channels of the time-multiplexed communication path can be used by other nodes for communication in a similar manner. Time-multiplexed loop transmission systems have been proposed which comprise two oppositely directed loops. Such systems have, however, been primarily unidirectional transmission systems, as above described, which utilize the second loop as a standby facility, in case of faults in the first loop.

It is the object of the present invention to establish communication between the nodes of a bidirectional, time-multiplexed loop transmission system in a manner which provides greater efficiency in the utilization of transmission and switching resources than has been heretofore achieved.

SUMMARY OF THE INVENTION

This and other objectives are met in the present invention through the combination of a bidirectional time-multiplexed communication loop, having a plurality of channels in both directions around the loop, each channel conveying data words in one direction, and a group of nodes at various positions around the loop, each of which has the capability of receiving from any incoming channels from either direction, for transmitting data words to any outgoing channel in either direction, for repeating data words from incoming channels from either direction to outgoing channels going in the same direction, and for generating signals defining a requested communication between a first and a second node. The invention further comprises a control arrangement which responds to the communication request signals by controlling the first node to transmit data words of the requested communication in one direction of the loop and to receive data words of the requested communication in the other direction of the loop and by controlling the second node to transmit data words of the requested communication on the other direction of the loop and to receive data words of the requested communication from the one direction of the loop.

In accordance with one aspect of the invention, the bidirectional communication loop may be separated into two unidirectional loops each conveying data words in one direction. In accordance with one feature of this invention, a centralized loop control arrangement controls the assignment of centralized loop control arrangement controls the assignment of particular communications to particular channels in communication lines of the time-multiplexed loop communication system. This ensures efficient utilization of available channels and permits reuse of corresponding channels in different portions of the loop. For example, the centralized loop control arrangement can achieve an efficient utilization of total system communication capabilities by first attempting to assign a new communication to a path involving the smallest number of intermediate nodes.

In accordance with another feature of this invention, in order to make efficient use of the facilities for repeating communications at a node, there exits a correspondence at each node between incoming channels on the facility receiving data words from one direction of the loop and outgoing channels on the facility transmitting data words in the same direction around the loop. This minimizes the equipment required at each node to repeat communications coming from other nodes and destined for other nodes.

BRIEF DESCRIPTION OF THE DRAWING

The foregoing and other objects, features and advantages of the present invention are illustrated in the following description of the drawing in which

FIGS. 2 and 3, when arranged in accordance with FIG. 4, form a detailed diagram of one communication node of the system; and FIG. 5 is a memory layout of a table used to select a path for a communication within the system.

DETAILED DESCRIPTION

Figure 1:
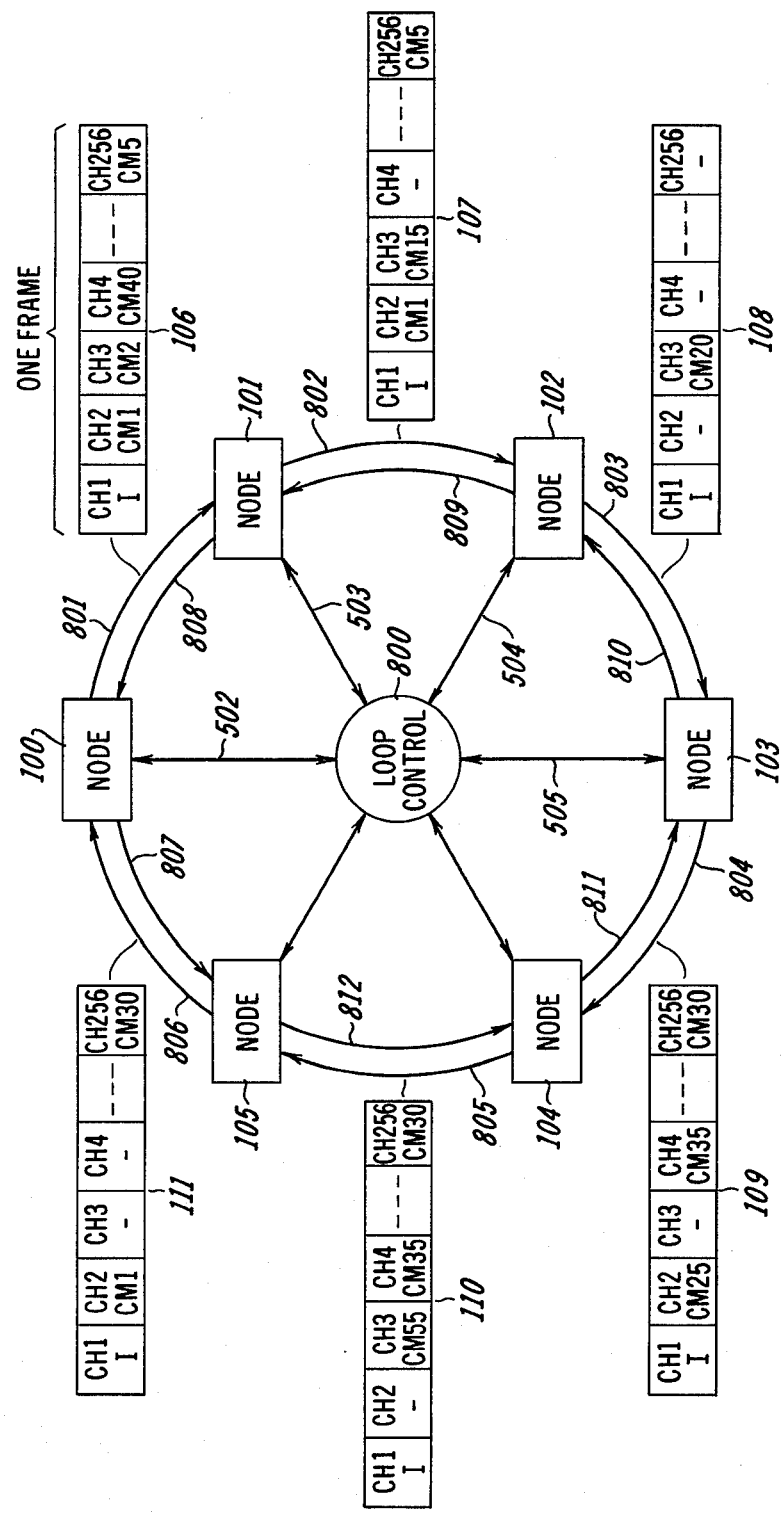
FIG. 1 is an overall depiction of the bidirectional, time-multiplexed loop communication system.

FIG. 1 is a block diagram of a bidirectional loop transmission system embodying the present invention. The embodiment of FIG. 1 includes six communication nodes 100 through 105, each of which is connected to two other communication nodes by a bidirectional communication arrangement. In the present embodiment, each bidirectional communication arrangement comprises two unidirectional communication lines. For example, the communication arrangement connecting communication node 101 to communication node 100 comprises communication lines 801 and 808. It should be noted that each of the communication lines in FIG. 1 terminates in an arrowhead denoting the direction of information transmission on that communication line. Further, in the description that follows, communication lines 801 through 806 are referred to as clockwise communication lines while the remaining communication lines, 807 through 812, are referred to as counterclockwise communication lines.

Communication nodes 100 through 105 of this exemplary embodiment intercommunicates over the communication lines, e.g., 801 and 802 in time-multiplex format, which comprises 125-microsecond frames of 256 recurring channels. For ease of understanding, the channels of each frame are numbered in sequence from 1 to 256. The basic unit of information communicated between communication nodes is an 8-bit data word, one of which can be transmitted in each channel of each frame. The 125-microsecond frame corresponds to an 8 kilohertz repetition rate. This rate, multiplied by 256 channels and by 8 bits per data word, corresponds to a 16.384 megahertz bit rate. A typical communication between two communication nodes comprises a plurality of data words transmitted and received by both communication nodes.

Each communication node 100 through 105 receives data words from both communication nodes connected thereto, transmits data words to both communication nodes connected thereto, and repeats data words received in channels, from one connected communication node on equivalent channels to the other connected communication node. The particular function performed, with respect to incoming and outgoing channels at each communication node, is determined by a loop controller 800 and communicated to the nodes which are responsible for implementing the performance of the determined functions. Communication between communication nodes is initiated when one communication node, called the origination node, generates a request for communication defining a second node called the destination node. In the present description, the terms origination and destination nodes refer only to the commencement of communication, since after communication between communication nodes is established, both nodes transmit and receive data words. All requests for communication are transmitted to loop controller 800 via a data path, e.g., 502. Loop controller 800 maintains a record of the status of all channels in both directions around the loop. Based on this record, loop controller 800 determines the path between origination and destination nodes which involves the smallest number of intermediate nodes. For example, when communication node 100 requests communication with communication node 101, a channel on clockwise communication line 801 is sought, since no intermediate node exists on communication line 801 between communication nodes 100 and 101. In accordance with the present embodiment, the selection of a channel and the direction of transmission of data words from the origination communication node to the destination communication node defines the channel and direction for transmission of data words from the destination communication node to the origination communication node. Data words from the destination node to the origination node are transmitted in a channel having the same numerical designation as is used in transmission from the origination node to the destination node, but in the opposite direction. For example, when channel 3 on communication line 801 is selected for communication from origination node 100 to destination node 101, then channel 3 on communication line 808 is used for transmission of data words from communication node 101 to communication node 100.

When intermediate communication nodes exist between origination and destination communication nodes, more than one communication line must be used for communication in each direction. For example, data words transmitted from communication node 100 to communication node 102 must be conveyed by both communication lines 801 and 802. In accordance with the present embodiment, loop controller 800 seeks a channel having the same numerical designation on both communication lines 801 and 802 for the transmission. For example, before channel 4 can be utilized for communication between communication node 100 and communication node 102, that channel must be available on both communication lines 801 and 802. After the communication lines and channels have been identified, loop controller 800 generates a control message for the origination node and destination node and transmits the control messages to those communication nodes.

Loop controller 800 has a choice of possible communication paths for setting up a connection between two communication nodes. For example, a connection between nodes 101 and 103 could be set up using communication lines (802, 803) and (810, 809), or using communication lines (808, 807, 812, 811) and (804, 805, 806, 801) for the two directions of communication. By choosing the path which involves fewer communication lines, in this case, (802, 803) and (810, 809) for the two directions, respectively, we minimize the number of communication lines used for this communication. Minimizing this number leads to the efficient utilization of the loop transmission facilities.

FIG. 1 includes six status representations 106 through 111 of channel occupancy during an exemplary time interval on communication lines 801 through 805. Each status representation is shown as an elongated rectangle connected to its associated communication line by a free hand line. Each segment of the status representations includes a channel designation, e.g., CH3 and the use being made of that particular channel. A dash under the channel designation indicates that the channel is unused. The term CM followed by a number indicates that the data words for a communication having a given numerical designation are being conveyed in the associated channel. The numerical designation of the communication is arbitrary, but it has the property that a given communication must retain the same designation throughout the duration of the communication, and that the same designation cannot apply to two different communications at the same time. For example, channel 3 (CH3) on communication line 801 is being used to convey data words which form communication 2 (CM2) from node 100 to node 101, as shown by status representation 106. By the previously described method of channel selection, channel 3 on communication line 808 is being used to convey data words which form communication 2 from communication node 101 to communication node 100.

The following is an example of the establishment of communication between an origination node 101 and a destination node 103. Communication node 101 generates a request for communication with communication node 103 and transmits that request via a data path 503 to loop controller 800. In response to the request for communication, loop controller 800 determines the direction of transmission including the smallest number of intermediate communication nodes between communication node 101 and communication node 103. In the present example, the smallest number of intermediate nodes occurs if communication node 101 transmits in the clockwise direction on communication line 802. The remainder of the communication path includes communication node 102 and communication line 803. After determining the communication line included, loop controller 800 searches the channel occupancy data associated with communication lines 802 and 803 to find an idle channel which exists on both of those communication lines. From the status representations 107 and 108, it can be seen that channel 4 is unoccupied on both communication lines 802 and 803. Further, as a result of the previously discussed channel assignment method, channel 4 is also idle on communication lines 810 and 809 from communication node 103 to communication node 101. Accordingly, loop controller 800 transmits a control message to communication node 101 defining the requested communication and indicating that communication node 101 should transmit data words on channel 4 of communication line 802 and receive data words from channel 4 of communication line 809 with regard to the requested communication. Loop controller 800 also notifies communication node 103 of the requested communication and instructs that node to transmit data words on channel 4 of communication line 810 and to receive data words on channel 4 of communication line 803. It is not necessary for loop controller 800 to instruct the intermediate communication node 102 to repeat data words received in channel 4 on communication line 802 on channel 4 of communication line 803 and to repeat data words received in channel 4 of communication line 810 on channel 4 of communication line 809, since, as described below, a node connected to idle incoming and outgoing channels is already in the repeat mode for these channels. Thus, communication is established between communication node 101 and communication 103 when each of these nodes receives a control message and implements the requested operation.

When the communication discussed above is to be disconnected, a control message is sent to loop controller 800 from the communication node (node 101 or 103), in which the disconnect request is detected. Loop controller 800 then sends a control message to communication node 101 requesting that data words no longer be transmitted on channel 4 of communication line 802, nor be received on channel 4 from communication line 809. Loop controller 800 also sends a control message to communication node 103 requesting that data words no longer be received on channel 4 of communication line 803 and no longer be transmitted on channel 4 of communication line 810. No message need be sent to intermediate communication node 102 since, as explained below, this node remains in the repeat (idle) mode for channel 4.

Figure 2:
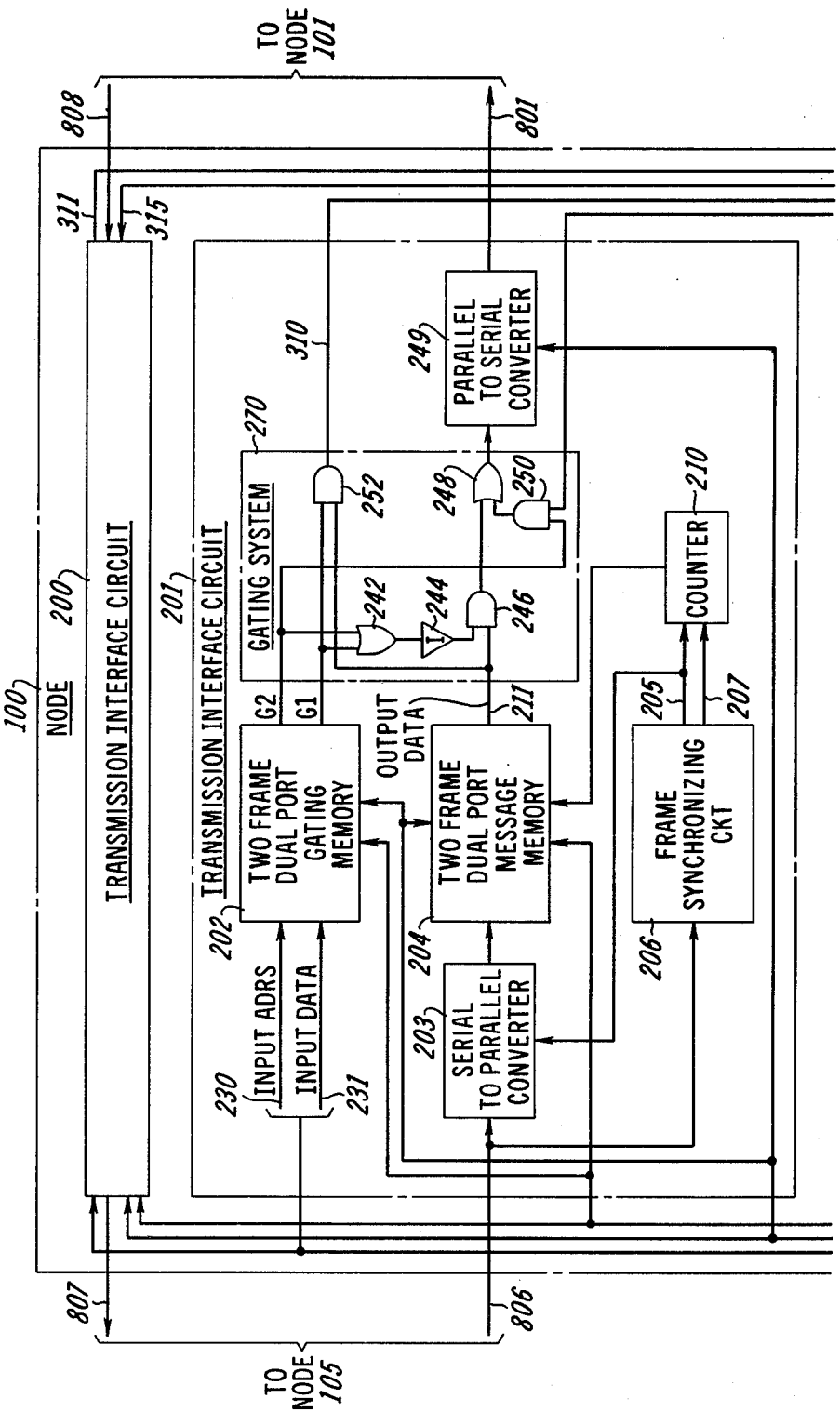

All of the communication nodes 100 through 105 are substantially identical so that only communication node 100 is shown and described in detail herein. FIG. 2 and 3 when arranged in accordance with FIG. 4 form a block diagram of communication node 100. Communication node 100 comprises two transmission interfaces 200 and 201, a utilization system 300, a node synchronization system 600 and a node controller 500 (FIG. 3). Transmission interface circuit 200 is connected to receive data words from communication node 101 on communication line 808 and is connected to transmit data words to communication node 105 on communication line 807. Similarly, transmission interface circuit 201 is connected to receive data words from communication node 105 on communication line 806 and to transmit data words to communication node 101 on communication line 801. A given transmission interface circuit, e.g., 200, can receive data words from a connected communication node, e.g., 101, transmit data words from an associated utilization system 300 to another communication node, e.g., 105, and can repeat data words received in time-multiplex channels from a first node, e.g., 101, on equivalent channels to a subsequent communication node, e.g., 105. The particular functions performed on incoming and outgoing channels are controlled by node controller 500 (FIG. 3). Node controller 500 maintains a map of the functions performed with regard to all incoming and outgoing channels and generates control signals which are transmitted to the transmission interface circuits 200 and 201 to control the performance of the desired functions.

The data words transmitted around the loop of the present embodiment are destined for or originated by utilization system 300 which is a part of each communication node, e.g., 100. Utilization system 300 may by any type of system which is capable of receiving or transmitting data words. As is described in greater detail later herein, utilization system 300 of the present embodiment comprises a time division switching system which is used to interconnect a plurality of telephone or data subscribers (not shown). Thus, the loop transmission system of the present embodiment is used to connect six telephone time division switching systems one of which is included in each communication node.

Transmission interface circuit 200 is substantially identical to transmission interface circuit 201 which is shown in detail in FIG. 2. Transmission interface circuit 201 receives data words from communication line 806, and transmits data words to communication line 801. The data words on communication line 806 are stored in dual port message memory 204, which has storage capacity for the data words of two frames of time-multiplexed data words. The data words are stored in locations of dual port memory 204 specified by addresses from a counter 210 which is synchronized with the incoming data on communication line 806. Transmission interface circuit 201 includes a frame synchronizing circuit 206 which receives the incoming bit stream on conductor 806 and recovers a 16.384 MHz clock signal therefrom. Frame synchronizing circuit 206 counts the cycles of the regenerated clock signal and transmits a logical "1" pulse to counter 210 every eighth clock cycle. Accordingly, a clock pulse is transmitted to counter 210 every eight incoming bits. Each time a logical "1" is received by counter 210 on conductor 205, the address applied to the message memory 204, to write inputs from serial-to-parallel converter 203 into the memory, is incremented by one. Counter 210 is a nine bit counter which counts the logical "1" pulses on conductor 205 up to 511, then resets to zero. Accordingly, counter 210 generates a recurring series of addresses from zero through 511 in response to the signals on conductor 205.

The bits of the incoming data word on conductor 806 are serially entered into a serial-to-parallel converter 203. The logical "1" pulses on conductor 205 are also connected to serial-to-parallel converter 203 to gate the output of that converter in parallel to message memory 204 in synchronism with the outputs of counter 210.

Each time frame consists of data words for 256 channels. The word in the first channel is a flag character word, used to identify the beginning of a frame. The flag character is denoted I in each status representation 106 through 111 of FIG. 1. There are many ways known to those skilled in the art for introducing this flag character into the data stream. For example, a flag character generator could be connected to one of the utilization devices 320 in one of the communication nodes, and connected through the utilization system to a communication line and could thence be transmitted around the loop. The first channel always contains this flag character word and is not available for the transmission of data words for communications between nodes. Frame synchronizing circuit 206 also searches the incoming bit stream for the flag character and generates a logical "1" on conductor 207 each time the flag character is received and verified as being the flag character. Arrangements for achieving frame synchronization from recurring flag characters are well known in the art and are not described in detail herein. Each logical "1" on conductor 207 resets the 8 least significant bits of counter 210 (leaving the counter at value 0 or 256) and resets the digit counter within frame synchronization circuit 206 so that proper synchronism is maintained.

Message memory 204 includes two frames (512) of storage locations in order to avoid possible conflicts in reading and writing data words. The data word associated with the first channel of a first frame is stored in the first location (address zero) of memory 204, the second word in the second location (address 1), etc. For the second frame, the first word is stored in the 257th location (address 256) and the final word is stored in the 512th location (address 511) of message memory 204. Thereafter, the first data word of the next frame is stored in the first location of memory 204 and the process is repeated.

Because it is desirable to store data words from two successive frames in memory 204, a nine bit counter 210, which cycles from 0 to 511, is used to control the storage action. In order to keep the counter in synchronism with the incoming data as monitored by the frame synchronizing circuit 206, counter 210 must be set to a value of 0 or 256 at the beginning of each frame. This is accomplished by resetting the 8 least significant bits of counter 210 whenever synchronizing circuit 206 detects the presence of the flag character. By keeping the most significant bit of counter 210 free from the reset action of frame synchronizing circuit 206, counter 210 can cycle from 0 to 511 without being reset to 0 when it reaches 256.

Information is read from memory 204 under the control of an output address generated by the node synchronizing system 600. Node synchronizing system 600 comprises a counter 606 and a clock 602 which generates a 16.384 MHz clock signal. Counter 606 responds to the clock signals from clock 602 by generating a recurring sequence of memory addresses from zero to 511 at the rate of one address per time-multiplexed channel. The addresses generated by counter 606 are transmitted to message memory 204 where they are used as read addresses. Additionally, signals from clock 602 are transmitted to the message memory 204 to provide timing for gating outputs. It is important that the clocks 602 of the various communication nodes remain substantially in synchronism. Accordingly, it is desirable to use very high accuracy clocks in each communication node or alternatively to provide separate connections for each communication node to a common clock. The result of the actions of counters 210 and 606 is that information enters message memory 204 at a time dictated by node 105 and the characteristics of communication line 806, and leaves memory 204 on conductor 205 at a time dictated by the node synchronizing system 600 of node 100.

The utilization system of the present embodiment comprises a time division switching system and a plurality of utilization devices 320. Utilization devices 320 comprise telephone subscriber sets and the associated circuitry required to interface those subscriber sets with time-multiplexed communication lines. The time division switching system comprises a plurality of input time-slot interchange units, e.g., 301 through 304, a plurality of output time-slot interchange units, e.g., 305 through 308 and a time-multiplexed switch 309, all of which operate under the control of a utilization system controller 400. Each input time-slot interchange unit 301 through 304 is connected to a respective one of time-multiplexed lines 310 through 313 from which the connected time-slot interchange unit receives data words. Similarly, each output time-slot interchange unit 305 through 308 is connected to a respective one of time-multiplexed lines 314 through 317 for the transmission of data words from the time division switching system. The time-multiplexed format on each of the time-multiplexed lines 310 through 317 comprises 125-microsecond frames of 256 channels, where each channel can convey one data word. Input time-slot interchange units 301 and 302 are connected to receive data words from a respective one of transmission interfaces 201 and 200 and output time-slot interchange units 305 and 306 are connected to transmit data words to a respective one of transmission interface circuits 201 and 200. The remaining input and output time-slot interchange units are connected to receive data words from and transmit data words to the utilization devices 320. From the well-known operation of time division switching systems, data words from utilization devices 320 can be switched to output time-slot interchange units 307 and 308 associated with other utilization devices or to output time-slot interchange units 306 and 305 associated with transmission interfaces 200 and 201. Additionally, utilization devices 320 can receive data words from other utilization devices or from the input time-slot interchange units 302 and 301 associated with transmission interfaces 200 and 201.

Time division switching systems operate in intervals of time referred to as time-slots. In order to maintain proper system operation, it is necessary that a sequence of time-slot designations be provided to control the functions performed during each of the given time-slots. The time-slot designations for the control of the time division switch of the present embodiment are derived from the addresses generated by counter 606. Counter 606 generates a 9-bit binary representation of the addresses zero through 511. The least significant eight bits of the addresses from counter 606 comprise a recurring sequence of addresses from zero to 255 at the rate of one address per time-multiplexed channel (time-slot). Accordingly, when an address zero is generated by counter 606, both the output side of message memory 204 and time division switching system will be treating the first channel of a first frame and at address 256, both the output side of message memory 204 and the time division switching system will be treating the first channel of a second frame. The operation of time division switching systems is well known in the art and is not described in detail herein. Details can be found in J. W. Lurtz, U.S. Pat. No. 4,206,322.

Communication node 100 receives data words from communication line 806, transmits data words to communication line 801, and repeats data from communication line 806 to 801. Transmission interface 201 carries out these functions separately, by gating each data word read from message memory 204 to either the communication line 801 or to the utilization system 300, and by controlling the transmission of data words from utilization system 300, to communication line 801. Transmission interface 201 includes gating system 270, which operates in response to control signals from a dual port gating memory 202, for controlling these distribution functions. Gating memory 202 comprises 512 storage locations each of which contain two control signals, G1 and G2. Gating memory 202 is read for every time-multiplex channel at the address generated by counter 210 which is the same address used to read message memory 204. Accordingly, each location in gating memory 202 corresponds to a storage location in message memory 204 which in turn corresponds to an incoming channel on communication line 806. However, because message memory 204 and gating memory 202 each store data for two consecutive frames, there are two locations in each of these stores which correspond to an incoming channel on communication line 806. The data for a given channel in gating memory 202 is read out in synchronism with the corresponding channel data word in message memory 204. The outputs of gating memory 202, labeled G1 and G2, control gating system 270, in conformance with Table 1. Whenever G1, G2=1, 0 the data word read from message memory 204 is transmitted to the utilization system input on time-multiplexed line 310 (receive mode). Whenever G1, G2=0, 1, a data word from the utilization system on time-multiplexed line 314 is transmitted to outgoing communication line 801 via a parallel to serial converter 249 (transmit mode). When G1, G2=1, 1, the transmit mode and receive mode exist simultaneously. When G2, G2=0, 0, the data word read from message memory 204 is transmitted to outgoing communication line 801 via parallel to serial converter 249 (repeat mode). Because of the synchronism between the utilization system and the transmission interface established through the common use of the node synchronizing system 600, the channels at the output of message memory 204 correspond to time-slots in the utilization system 300.

The operation of the gates which comprise gating system 270 will now be described in detail.

TABLE I

| Control of Transmission Interface Actions | |
|---|---|
| Output of Memory | Transmission State |
| G1 G2 | |
| 0  0 | repeat mode |
| 1  0 | receive mode |
| 0  1 | transmit mode |
| 1  1 | transmit and receive mode |

Gating system 270 comprises AND gates 246, 250 and 252, OR gates 242 and 248, and an inverter 244. Gates 246, 248, 250 and 252 are each shown as individual gates but are in actuality eight gates of the same type connected in parallel to accommodate eight parallel digits of a data word. AND gate 252 responds to each logical "1" signal G1 by gating the data word read from message memory 204 to input time-slot interchange unit 301 via time-multiplex line 310. Similarly, AND gate 250, responds to each logical "1" signal G2 by gating data words from time-slot interchange unit 305, to communication line 801 via OR gate 248 and parallel-to-serial converter 249. Signals G1 and G2 are both connected to the inputs of OR gate 242, whose output is inverted by inverter 244. Accordingly, the output of inverter 244 is a logical "1" whenever G1=G2=0 which is the repeat mode for the transmission interface circuit 201. AND gate 246, which receives data words read from message memory 204, is controlled by the output of inverter 244 to gate those data words to communication line 801 via OR gate 248 and parallel-to-serial converter 249 when the condition G1=G2=0 exists.

Control signals are stored in gating memory 202 under the control of node controller 500 in response to control messages received via data path 502 from loop controller 800. To store a particular value of G1 and G2, the values of G1 and G2, and the address at which they are to be stored are sent via conductors 230 and 231 to the input port of gating memory 202. Since gating memory 202 is a dual port memory, signals may be stored in the memory at the same time that control signals are read from the memory. Thus, new values of G1 and G2 can be stored without interfering with the continued operation of the transmission interface. These new values of G1 and G2 must be stored in two locations, the locations corresponding to the channel in each of the two frames stored in gating memory 202. For example, new values of G1 and G2 for channel 4 must be stored in addresses 3 and 259.

In the present embodiment, the states of G1, G2, have been selected so that 0, 0 represents both the repeat state and the idle state. Thus, when a communication is completed and the channel utlilized for that communication is idled in both the origination and destination nodes, that channel automatically is in this repeat state for later use. The path for a given data word from a transmission interface to a utilization system is set up by setting G1=1 for that channel, and is idled by setting G1=0. Similarly, the path for a given time-slot from a utilization system to a channel in an outgoing communication line is established by setting G2=1 for that channel, and is idled by setting G2=0. By setting G1 or G2, respectively, equal to 0 for the proper channel whenever a path is released, on one side of a node, and correspondingly, by setting G2 or G1, respectively, equal to zero for the same channel whenever a path is released on the other side of the node, we ensure that if, for a given channel, paths have been released on both sides of the node, G1 and G2 will be set to zero in both transmission interfaces whenever a channel is idle through a given node. Since G1, G2=0, 0 represents both the idle and the repeat mode, all intermediate nodes in a connection, which are, by the nature of the path selection process, connected to idle incoming and outgoing channels, are in the repeat state.

The source of control information for setting up appropriate paths within transmission interface 201 is loop controller 800. Controller 800 assigns communications to specific channels on specific communication lines. Loop controller 800 maintains in its storage a table indicating availability of channels on each communication line. Such a table, 850, is shown in FIG. 5. Each row in FIG. 5 corresponds to one of the 256 channels present on each communication line and each column represents the status of the channels of a designated communication line and the communication line in the opposite direction between the same nodes. In this embodiment, the same channel is used for the two directions of communication, so that a given channel is either busy in both of these communication lines, or idle in both. A 1 in a given row/column intersection indicates that a particular channel on a particular communication line is in use while a 0 in a given row/column intersection indicates that a particular channel on a particular communication line is idle. For example, the 1 in the shaded square at the intersection of the third row (channel 3) and the 2nd column (communication lines 802 and 809) indicates that channel 3 of communication lines 802 and 809 is in use. Table 850 conforms with the status representations 106 through 111 shown in FIG. 1. Loop controller 800 uses the table 850 represented in FIG. 5 to search for available channels between two nodes.

Suppose, for example, that a request is made for a connection from a utilization device in node 101 to a utilization device in node 103. Transmission from node 101 to node 103 could occur in the clockwise direction on communication lines 802 and 803, or it could occur in the clockwise direction on communication lines 808, 807, 812, and 811. Loop controller 800 selects the connection comprising communication lines 802 and 803 since that connection consists of fewer communication lines. Loop controller 800 then initiates a search of its storage area (table 850) for a channel available on communication lines 802 and 803. Channel 4 is available on both of these communication lines as shown in FIG. 5 by the 0's present in the second and third positions of row 4. A connection could be set up using channel 4 which would then be marked 1 for communication lines 802 and 803 to prevent another use of this channel on these communication lines for the duration of the connection.

Consider now an example, in which an originating telephone connected to a utilization device 320 in node 101 dials the number of a telephone connected to a utilization device 320 in node 103. The destination telephone number dialed by the originating customer is detected and assembled by utilization system controller 400 in node 101. The number is transmitted to node controller 500, which translates the number and recognizes that it belongs to a telephone connected via a utilization device to node 103. (In this embodiment, the translation is made in node controller 500; in other embodiments, it could be made in loop controller 800.) Node controller 500 in node 101 sends a control message identifying the originating and destination telephones over data path 503 to loop controller 800. Loop controller 800 analyzes the data message, recognizes that a path must be set up between nodes 101 and 103, and checks for an available channel between these two nodes. As described above, channel 4 is such an available channel using communication lines 802 and 803. Loop controller 800 then marks this channel unavailable in the memory locations corresponding to communication lines 802 and 803, of its storage table 850, and sends messages to nodes 101 and 103. If no channels were available using communication lines 802 and 803, it would be possible to utilize an available channel using communication line 808, 807, 812, and 811.

The message to node 101, sent to node controller 500 via data path 503, requests that node to connect data words representing signals from the originating telephone to channel 4 on communication line 802. Node controller 500 transmits a message to utilization system controller 400 indicating that data words from the originating telephone are to be transmitted to channel 4 of time multiplex line 314. Utilization system controller 400 then controls the time division switch to complete the necessary path utilizing one of the time-slot interchangers 303, . . . , 304, the time-multiplex switch 309, and time-slot interchange unit 305. Node controller 500 also controls the writing of a 1 into the G2 position of the channel 4 word and the channel 260 word of the dual port gating memory 202 of transmission interface 201 to gate the data words in channel 4 from the utilization system 300 to communication line 802. Since transmission from node 101 occurs in channel 4 on communication line 802, that node must receive data words in channel 4 of communication line 809, and therefore, a path must be set up in transmission interface 200 of node 101. Accordingly, node controller 500 writes a 1 in the G1 position of the channel 4 word and the channel 260 word of the dual port gating memory 202, of transmission interface 200 to gate the data words of channel 4 on communication line 809 to time-slot interchange unit 302. Further, node controller 500 notifies utilization system controller 400 to establish a path from time-slot interchange unit 302, through time-multiplex switch 309, and one of the time-slot interchange units 307, . . . , 308, to the utilization device 320 connected to the originating telephone.

The message from loop control 800 to node 103, sent via data path 505, requests that node to connect data words from the destination telephone to channel 4 on communication line 810 and to connect data words from channel 4 on communication line 803 to the destination telephone. These connections are established in a manner substantially identical to the connection establishment in node 101.

Note that no message need be sent to node 102 in this specific embodiment. The encoding of G1, G2 has been chosen so that the idle state of a channel, G1, G2=0, 0, also represents the repeat mode. Thus, node 102 is already in a state in which it can transmit data words on channel 4 from communication line 802 to communication line 803, and from communication line 810 to communication line 809. In other embodiments, it may be more convenient to send control messages to intermediate nodes.

Suppose, now, that a request for disconnection is detected for this communication. Such a request may be detected at the origination node or the destination node. Assume that the disconnection request is initiated by the destination customer connected to communication node 103. In communication node 103, the disconnection request is detected by the utilization system controller 400 which transmits this information to node controller 500. Node controller 500 transmits this information to loop controller 800 by means of a control message sent over data path 505. Loop controller 800 then sends a control message to node controller 500 in node 101 via data path 503, requesting node controller 500 to release the path from the originating telephone to channel 4 of communication line 802 and from communication line 809 to the originating telephone. In response to this control message, the following actions are performed:

1. Utilization system controller 400 deletes the path from the originating telephone to channel 4 of time-multiplex line 314, and from time-slot 4 of time-multiplex line 311 to the originating telephone.

2. Node controller 500 writes a 0 in the G1 positions of the channel 4 word and the channel 260 word of the dual port gating memory 202 of transmission interface circuit 200, and writes a 0 in the G2 positions of the channel 4 word and the channel 260 word of the dual port gating memory 202 of transmission interface circuit 201.

Loop controller 800 also sends a data message to node controller 500 in node 103 via data path 505, requesting node controller 500 to release the path from the destination telephone to channel 4 of communication line 810, and from communication line 803 to the destination telephone. This message initiates a corresponding set of actions in node 103 to disconnect the destination telephone from channel 4 on communication lines 803 and 810.

No message need be sent to communication node 102 since in this embodiment, this node can remain in the repeat or idle mode for channels 4 and 260 in transmission interfaces 200 and 201 throughout the communication. Loop controller 800 now marks channel 4 available for communication lines 802, 809 and 803, 810 by writing a 0 in the corresponding two bit locations of map 850, in order to be ready for a new communication which might need these channels on these communication lines.

It will be understood that the above-described system is merely an illustrative embodiment and that numerous other arrangements may be devised by those skilled in the art without departing from the spirit and scope of this invention. For example, other utilization systems could be used, including analog systems with appropriately placed analog-to-digital converters to interface with the transmission interfaces. Other transmission interfaces could be used with different arrangements for handling the time shift between the transmission interface input and output, and for handling the control of gating between the transmission interface and the utilization system. Additionally, the loop controller could be physically located at one of the nodes, and the node controller at that node could take over the function of the loop controller as well as its own. Messages for the control of the node controllers and for the loop controller could be sent via the communication lines.

The communication node used in this type of bidirectional time-multiplexed loop communication system can also be utilized in other network topologies using time-multiplexed communication lines, since it offers great flexibility for handling originating and destination communications at each communication node, and requires only a relatively small investment for repeating communications coming from other nodes and destined for other nodes. For example, it can be used for a bidirectional time-multiplexed communication system in which all the nodes are connected in a linear fashion, the end nodes not being connected to each other.

What is claimed is:

1. A bidirectional loop transmission system comprising:
   a first unidirectional time-multiplexed communication loop for conveying data words in a predetermined number of channels in a first direction;
   a second unidirectional time-multiplexed communication loop for conveying data words in said predetermined number of channels in a second direction, said second direction being the opposite of said first direction;
   a plurality of nodes connected to said first and said second time-multiplexed communication loops and comprising a communication means for transmitting data words in the channels of said first and said second time-multiplexed communication loops, for receiving data words from the channels of said first and said second time-multiplexed communication loops, and for repeating data words received in the channels of said first and said second time-multiplexed communication loops;
   means for generating communication request signals defining a requested communication between a first and a second one of said plurality of nodes; and
   first control means responsive to said communication request signals for identifying one of said time-multiplexed communication loops as a time-multiplexed communication loop having the minimum number of intermediate nodes between said first and second node and for controlling the communication means of said first node to transmit data words of said requested communication in the channels on said time-multiplexed communication loop having the minimum number of intermediate nodes and to receive data words of said requested communication from the channels on the other of said time-multiplexed communication loops and for controlling the communication means of said second node to transmit data words of said requested communication in the channels of said other time-multiplexed communication loop and to receive data words of said requested communication from the time-multiplexed channels on said time-multiplexed communication loop having the minimum number of intermediate nodes.

2. A bidirectional loop transmission system comprising:
   a first unidirectional time-multiplexed communication loop for conveying data words in a predetermined number of channels in a first direction;
   a second unidirectional time-multiplexed communication loop for conveying data words in said predetermined number of channels in a second direction, said second direction being the opposite of said first direction;
   a plurality of nodes connected to said first and said second time-multiplexed communication loops and comprising a communication means for transmitting data words in the channels of said first and said second time-multiplexed communication loops, for receiving data words from the channels of said first and said second time-multiplexed communication loops, and for repeating data words received in the channels of said first and said second time-multiplexed communication loops;
   means for generating communication request signals defining a requested communication between a first and a second one of said plurality of nodes; and
   first control means responsive to said communication request signals for controlling the communication means of said first node to transmit data words of said requested communication in the channels on one of said time-multiplexed communication loops and to receive data words of said requested communication from the channels on the other of said time-multiplexed communication loops and for controlling the communication means of said second node to transmit data words of said requested communication in the channels of said other time-multiplexed communication loop and to receive data words of said requested communication from the time-multiplexed channels on said one time-multiplexed communication loop, said first control means comprising:

means for selecting said one time-multiplexed communication loop for transmission from said first node to said second node and for selecting said other time-multiplexed communication loop for transmission from said second node to said first node;

means for generating idle channel signals identifying the unused channels on said one and said other time-multiplexed communication loops between said first and said second nodes;

control signal generating means responsive to said idle channel signals for generating control signals defining one idle channel on said one time-multiplexed communication loop, and one idle channel on said other time-multiplexed communication loop; and means responsive to said control signals for controlling the communication means of said first and said second node.

3. The bidirectional loop transmission system in accordance with claim 2 wherein said means for selecting comprises means for identifying one of said time-multiplexed communication loops as a time multiplexed communication loop having the smallest number of intermediate nodes between said first and said second node for transmission from said first node; and means for selecting the time-multiplexed communication loop identified by said means for identifying as said one time-multiplexed communication loop for transmission from said first node to said second node.

4. The bidirectional loop transmission system in accordance with claims 1, 2, or 3 further comprising means for identifying intermediate nodes between said first and said second nodes; and means for controlling said intermediate nodes to repeat data words transmitted from said first node to said second node and to repeat data words transmitted from said second node to said first node.

5. The bidirectional loop transmission system in accordance with claim 2 wherein each of said channels on said first time-multiplexed communication loop uniquely corresponds to one of the channels on said second time-multiplexed communication loop and said control signal generating means comprises means for generating control signals defining one idle channel on said one time-multiplexed communication loop and the channel on said other time-multiplexed communication loop corresponding to said one idle channel on said one time-multiplexed communication loop; and means responsive to said control signals for controlling the communication means of said first and said second node.

6. A bidirectional loop transmission system in accordance with claims 2 or 3 comprising:

means for generating disconnect request signals defining a particular communication which is to be disconnected; and means responsive to said disconnect request signals for controlling the communication means of said first node and said second node to terminate the transmission and reception of data words in the channels of said first and said second unidirectional time-multiplexed communication loops utilized for said communication to be terminated.

7. A bidirectional loop transmission system in accordance with claim 6 further comprising means responsive to said disconnect request signals for controlling the communication means of said first node to repeat the data words received in the channels of said one time-multiplexed communication loop utilized for said communication to be terminated and to repeat the data words received in the channels of said other time-multiplexed communication loop utilized for said communication to be terminated.

8. A bidirectional loop transmission system comprising:

a bidirectional time-multiplexed communication loop for conveying data words in a predetermined number of channels in a first direction and for conveying data words in said predetermined number of channels in a second direction, said second direction being the opposite of said first direction;

a plurality of nodes connected to said loop and comprising a communication means for transmitting data words in said channels of said first and said second directions, for receiving data words from said channels of said first and second directions, and for repeating data words received in said channels of said first direction and said second direction;

means for generating communication request signals defining a requested communication between a first and a second one of said plurality of nodes; and first control means responsive to said communication request signals for identifying one direction of said bidirectional time-multiplexed communication loop as a direction having the minimum number of intermediate nodes between said first and said second node and for controlling the communication means of said first node to transmit data words of said requested communication in channels of said direction of said loop having the minimum number of intermediate nodes and to receive data words of said requested communication of said loop from channels of the other direction of said loop and for controlling the communication means of said second node to transmit data words of said requested communication in said channels of said other direction of said loop and to receive data words of said requested communication from channels of said direction of said loop having the minimum number of intermediate nodes.

9. A bidirectional loop transmission system comprising:

a bidirectional time-multiplexed communication loop for conveying data words in a predetermined number of channels in a first direction and for conveying data words in said predetermined number of channels in a second direction, said second direction being the opposite of said first direction;

a plurality of nodes connected to said loop and comprising a communication means for transmitting data words in said channels of said first and said second directions, for receiving data words from said channels of said first and second directions, and for repeating data words received in said channels of said first direction and said second direction;

means for generating communication request signals defining a requested communication between a first and a second one of said plurality of nodes; and first control means responsive to said communication request signals for controlling the communication means of said first node to transmit data words of said requested communication in channels of one direction of said loop and to receive data words of said requested communication of said loop from channels of the other direction of said loop and for controlling the communication means of said second node to transmit data words of said requested communication in said channels of said other direction of said loop and to receive data words of said requested communication from channels of said one direction of said loop, said first control means comprising:

means for selecting channels of said one direction of said loop for transmission from said first node to said second node and for selecting channels of said other direction of said loop for transmission from said second node to said first node;

means for generating idle channel signals identifying the unused channels in said one direction and said other direction of said loop between said first and said second nodes;

control signal generating means responsive to said idle channel signals for generating control signals defining one idle channel of said one direction of said loop, and one idle channel of said other direction of said loop; and means responsive to said control signals for controlling the communication means of said first and said second node.

10. The bidirectional loop transmission system in accordance with claim 9 wherein said means for selecting comprises means for identifying one of the directions of said loop as a direction having the smallest number of intermediate nodes between said first and said second node for transmission from said first node; and means for selecting channels in said one direction identified by said means for identifying for transmission from said first node to said second node.

11. The bidirectional loop transmission system in accordance with claims 8, 9 or 10 further comprising means for identifying intermediate nodes between said first and said second nodes; and means for controlling said intermediate nodes to repeat data words transmitted from said first node to said second node and to repeat data words transmitted from said second node to said first node.

12. The bidirectional loop transmission system in accordance with claim 9 wherein each of said channels in said first direction of said loop uniquely corresponds to one of the channels in said second direction of said loop and said control signal generating means comprises means for generating control signals defining one idle channel in said one direction of said loop and the channel in said other direction of said loop corresponding to said one idle channel in said one direction of said loop; and means responsive to said control signals for controlling the communication means of said first and said second node.

13. A bidirectional loop transmission system in accordance with claim 1 comprising:

means for generating disconnect request signals defining a particular communication which is to be disconnected; and means responsive to said disconnect request signals for controlling the communication means of said first node and said second node to terminate the transmission and reception of data words in the channels of said first and said second unidirectional time-multiplexed communication loops utilized for said communication to be terminated.

14. A bidirectional loop transmission system in accordance with claim 13 further comprising means responsive to said disconnect request signals for controlling the communication means of said first node to repeat the data words received in the channels of said time-multiplexed communication loop having the minimum number of intermediate nodes utilized for said communication to be terminated and to repeat the data words received in the channels of said other time-multiplexed communication loop utilized for said communication to be terminated.

* * * * *